US011581130B2

(12) United States Patent
He et al.

(10) Patent No.: US 11,581,130 B2
(45) Date of Patent: Feb. 14, 2023

(54) INTERNAL THERMAL FAULT DIAGNOSIS METHOD OF OIL-IMMERSED TRANSFORMER BASED ON DEEP CONVOLUTIONAL NEURAL NETWORK AND IMAGE SEGMENTATION

(71) Applicant: WUHAN UNIVERSITY, Hubei (CN)

(72) Inventors: Yigang He, Hubei (CN); Jiajun Duan, Hubei (CN); Liulu He, Hubei (CN)

(73) Assignee: WUHAN UNIVERSITY, Hubei (CN)

( * ) Notice: Subject to any disclaimer, the term of this patent is extended or adjusted under 35 U.S.C. 154(b) by 451 days.

(21) Appl. No.: 16/740,508

(22) Filed: Jan. 13, 2020

(65) Prior Publication Data

US 2021/0020360 A1 Jan. 21, 2021

(30) Foreign Application Priority Data

Jul. 15, 2019 (CN) .......................... 201910637123.9

(51) Int. Cl.
| | |
|---|---|
| *G06K 9/36* | (2006.01) |
| *H01F 27/40* | (2006.01) |
| *G06T 7/11* | (2017.01) |
| *G06T 7/174* | (2017.01) |
| *G06N 20/00* | (2019.01) |

(Continued)

(52) U.S. Cl.
CPC .......... *H01F 27/402* (2013.01); *G06F 30/27* (2020.01); *G06K 9/6256* (2013.01); *G06N 3/08* (2013.01); *G06N 20/00* (2019.01); *G06T 7/11* (2017.01); *G06T 7/174* (2017.01);

(Continued)

(58) Field of Classification Search
CPC ................... G06V 10/82; G06V 10/25; G06T 2207/20081; G06T 2207/20084; G06T 3/4046; G06T 9/002; G06T 7/0002–7/001; G06T 2207/30108; G06T 2207/30168; G06T 2207/10048; G06T 7/10–7/194; G06N 3/063; G06N 3/02–3/105; G06N 20/00–20/20; H01F 27/12
See application file for complete search history.

(56) References Cited

PUBLICATIONS

Duan et al., "Intelligent Localization of Transformer Internal Degradations Combining Deep Convolutional Neural Networks and Image Segmentation", IEEE Access, Special Section on Advances in Prognostics and System Health Management, vol. 7, 2019, pp. 62705-62720. (Year: 2019).*

* cited by examiner

*Primary Examiner* — Brian Werner
(74) *Attorney, Agent, or Firm* — JCIPRNET

(57) ABSTRACT

The disclosure provides an internal thermal fault diagnosing method for an oil-immersed transformer based on DCNN and image segmentation, including: 1) dividing an internal area of a transformer, and using fault areas and normal status as labels of DCNN; 2) through lattice Boltzmann simulation, randomly obtaining multiple feature images of the internal temperature field distribution of the transformer under normal and various fault state modes, and the fault area serves as a label to form the underlying training sample set; 3) obtaining historical monitoring information of the infrared camera or temperature sensor, and forming its corresponding fault diagnosis results into labels; 4) combining all monitoring information contained in each sample into one image, and then extracting the same monitoring information from the samples in the sample set to form a new image; 5) segmenting image sample and then inputting the same into DCNN for training to obtain diagnosis results.

15 Claims, 3 Drawing Sheets

(51) Int. Cl.
*G06F 30/27* (2020.01)
*G06K 9/62* (2022.01)
*G06N 3/08* (2006.01)
*G06F 119/08* (2020.01)

(52) U.S. Cl.
CPC ............... *G06F 2119/08* (2020.01); *G06T 2207/20212* (2013.01); *H01F 2027/406* (2013.01)

| | Initial contour | Contour line | Contour line and winding edge |

INTERNAL THERMAL FAULT DIAGNOSIS METHOD OF OIL-IMMERSED TRANSFORMER BASED ON DEEP CONVOLUTIONAL NEURAL NETWORK AND IMAGE SEGMENTATION

CROSS REFERENCE TO RELATED APPLICATION

This application claims the priority benefits of China application serial no. 201910637123.9, filed on Jul. 15, 2019. The entirety of the above-mentioned patent application is hereby incorporated by reference herein and made a part of specification.

BACKGROUND

Technical Field

The disclosure relates to a fault diagnosis method for a power transformer, in particular to a method and system for diagnosing and positioning internal thermal faults of an oil-immersed transformer based on a deep convolutional neural network and image segmentation.

Description of Related Art

Fault diagnosis of essential power transmission and transformation equipment such as power transformers is important for keeping power systems safe and ensuring smooth economic operation. Analysis of the internal temperature field of a transformer has been a hot issue in area of monitoring process. Commonly used power transformer temperature monitoring methods usually focus on the monitoring of hotspot temperatures, or obtaining the relationship between external temperature and internal faults through reasonable estimation based on equivalent mathematical models. Such method is effective, but it requires the use of model deriving formulas for different power equipment. When mechanical parts become aged or there are presence of impurities, the monitoring standards need to be changed, and deep learning can realize automatic detection of monitoring information features and abnormal states, which is one of the directions for development in the area of fault diagnosis. Lattice Boltzmann method (LBM) has the advantages of simplicity, high calculation efficiency, and parallel processing. LBM can quickly simulate the temperature distribution inside the transformer and supplement the shortage of monitoring samples.

Using deep convolutional neural network (DCNN) can automatically extract fault features, and as the operating state changes continuously, the network parameters can also be dynamically adjusted through continuous training. Since image monitoring data such as infrared thermal images contain more redundant information, image segmentation methods can be used to extract edge features and compress data. Souleymane et al. proposed an automatic segmentation algorithm based on LBM and level set method (LSM), which has the advantages of being fast, anti-noise, and not restricted by the initial contour setting. By combining the automatic segmentation algorithm with DCNN, it is possible to determine the fault diagnosis result based on very little monitoring information, and thereby realizing positioning of fault.

SUMMARY

In order to overcome the shortcomings in the above background technology, the present disclosure provides an internal thermal fault diagnosis method of oil-immersed transformer based on deep convolutional neural network and image segmentation, which is smarter and has small data transmission amount.

The technical solution adopted by the present disclosure to solve its technical problems is:

A method for diagnosing internal thermal faults in an oil-immersed transformer based on a deep convolutional neural network and image segmentation is provided, including the following steps:

1) dividing the internal area of the transformer, and using the fault area and normal status as the labels of the deep convolutional neural network;

2) through the lattice Boltzmann simulation, randomly obtaining a large number of feature images of the internal temperature field distribution of the oil-immersed transformer under normal and various fault state modes, and the fault area is used as a label to form the underlying training sample set;

3) obtaining the historical monitoring information of the infrared camera or temperature sensor, and forming the corresponding fault diagnosis results into labels according to the division method of step 1);

4) combining all the monitoring information contained in each sample in step 3) into one image, and then extracting the same monitoring information from the samples in the underlying training sample set obtained in step 2) to form a new image;

5) segmenting the image sample obtained in step 4), and then inputting the segmented image into the deep convolutional neural network for training to generate a trained fault diagnosis network;

6) combining the monitoring information to be diagnosed into new images in the same way, and entering the new images into the trained fault diagnosis network to obtain diagnosis results.

Further to the above technical solution, the method for dividing and labeling the internal area of the transformer in step 1) is: dividing the internal area of the transformer into several parts according to the actual monitoring requirement, and then directly assign labels according to the fault area, if there are multiple fault types, different combinations of fault types and fault areas are used as different labels.

Further to the above technical solution, in step 2), when conducting internal temperature field simulation of the oil-immersed transformer under various fault conditions based on the lattice Boltzmann method, the boundary condition of the fault location is modified to a bounce boundary, and the size of the fault area thereof is a random value less than 10, which is the sum of length and width; the convergence criterion is defined by calculating the temperature increment at each step until it is less than the predefined threshold ε:

$$\sum_x \frac{|T(x, t) - T(x, t-1)|}{|T(x, t)|} < \varepsilon$$

wherein T is the temperature, x is the coordinates of any point in the transformer, and t is the iteration step or simulation time.

Further to the above technical solution, in step 3), the normal state data set is subtracted from the monitoring information and combined to obtain a feature image of the temperature field distribution.

Further to the above technical solution, the method for combining the monitoring information of the infrared camera or temperature sensor into an image in step 4) is: firstly unifying all the monitoring information into a color map of a specific value range, and then combine all the information of the same sample into a picture.

Further to the above technical solution, the image segmentation method in step 5) uses LBM to solve the convection-diffusion equation. The particle density is set to $\varphi$, which is called the symbolic distance function, and represents the distance between pixels inside and outside the initial contour. Since the number of particles in each lattice cannot be negative, the number of particles is modified to $\varphi'=\varphi-\min(\varphi)$, the superscript "'" represents the updated value; then the contour after segmentation is a pixel that satisfies $\varphi'=-\min(\varphi)$, and the calculation steps are as follows:

① Initialize the symbol distance function $\varphi$, set $\varphi'=\varphi-\min(\varphi)$; the diffusion coefficient is set as $\gamma=15$, then relax time is $\tau=(9*\gamma+2)/4$; $f_{out}$ represents the particle distribution of $f_{in}$ at the next moment, $f_{eq}$ is the equilibrium particle distribution, initialize $f_{out}=f_{in}=f_{eq}=0$.

② Mark the k-th type of centroid to be $v_k$, initialize $v_k=0$. Generally k=1 or 2, that is, the total number of types c=2 (including contour and non-contour areas).

③ Assuming that the image has N pixels in total, i=1, 2, ..., N, define the block matrix $U=\{u_{ki}\}$, and each element $u_{ki}$ thereof represents the membership degree of the i-th pixel belonging to the k-th type. U is a function of the original image value X and the observed image value Y. It is written as a matrix form $U_k^p(x,y)$, p is the blur index generally set as the constant p=2; the contour image is marked as $Y=\{y_i\}$, which represents the non-linear change of the distance function J of the original image after taking grayscale. Then:

$$J(U, V, X) = \sum_{k=1}^{c} \sum_{i=1}^{N} u_{ki}^p \|x_i - v_k\|^2$$

$$\text{s.t.} \sum_{k=1}^{c} u_{ki} = 1, 0 \leq u_{ki} \leq 1, \forall k, i$$

wherein $v_k$ represents the k-th type of centroid, set the initial bias field image be $B=\{\beta_i\}$, which is also a function of X and Y, then:

$$U_k^*(x, y) = \frac{1}{\sum_{l=1}^{c} \left(\frac{\|Y(x,y)-B(x,y)-v_k\|}{\|Y(x,y)-B(x,y)-v_l\|}\right)^{\frac{2}{(p-1)}}}$$

$$v_k^* = \frac{\int_\Omega U_k^p(x,y)(Y(x,y)-B(x,y))dxdy}{\int_\Omega U_k^p(x,y)dxdy}$$

$$B^*(x, y) = Y(x, y) - \frac{\sum_{k=1}^{c} U_k^p(x,y)v_k}{\sum_{k=1}^{c} U_k^p(x,y)}$$

wherein l is the variable used to traverse c and $\Omega$ is the solution area.

④ Calculate the fuzzy external force F:

$$F=\lambda(U_1^p(x,y)\|Y(x,y)-B(x,y)-v_1\|^2 - U_2^p(x,y)\|Y(x,y)-B(x,y)-v_2\|^2$$

⑤ Calculate the lattice Boltzmann LBM convection collision process:

$$f_{out} = f_{in} - \frac{f_{in} - f_{eq}}{\tau} + \frac{2\tau - 1}{2\tau}F$$

wherein $f_{eq}$ is the product of the level set equation $\varphi'$ and LBM lattice constants for each iteration.

⑥ Update $f_{in}'=f_{out}$, $\varphi'=\varphi'+f_{in}'$, and return to step ③ and repeat the iterations until the requirement is satisfied.

Further to the above technical solution, the convolutional neural network for fault diagnosis in step 5) needs to take into consideration the network depth, network size, number of network layers, and number of parameters according to the monitoring requirement, and the accuracy, simulation time, and loss function of the fault diagnosis is obtained through verification. A suitable convolutional neural network is adopted to modify the number of labels to the total number of network outputs for training verification and fault diagnosis.

The disclosure also provides an internal thermal fault diagnosis system for an oil-immersed transformer based on a deep convolutional neural network and image segmentation, including:

an area division module, which is configured to divide the internal area of the transformer, and use the fault area and normal status as labels of the deep convolutional neural network;

a simulation module, which is configured to perform simulation through a lattice Boltzmann method to randomly obtain a large number of feature images of the internal temperature field distribution of the oil-immersed transformer under normal and various fault state modes, and the fault area thereof is used as a label to form an underlying training sample set;

a historical monitoring information acquisition module, which is configured to acquire historical monitoring information of the infrared camera or temperature sensor, and form the corresponding fault diagnosis results into labels according to the division method of the area division module;

an image combining module, configured to combine all the monitoring information contained in each sample in the historical monitoring information acquisition module into one image, and then extract the same monitoring information from the samples in the underlying training sample set obtained through the simulation module to form a new image;

an image segmentation module, configured to perform image segmentation on the image samples obtained through the image combining module;

a fault diagnosis network generating module, configured to input the segmented image into a deep convolutional neural network for training, and generate a trained fault diagnosis network;

a fault diagnosis module, which is used to combine the monitoring information to be diagnosed into new images in the same way, and enter the new images into the trained fault diagnosis network to obtain diagnosis results.

The present disclosure also provides a computer storage medium. The computer storage medium stores a computer program executable by a processor. The computer program executes steps of the internal thermal fault diagnosis method of the oil-immersed transformer based on the deep convolutional neural network and image segmentation.

The advantageous effect of the present disclosure is that the present disclosure uses deep convolutional neural network and image segmentation processing method to extract and classify the fault features of windings of oil-immersed power transformers, which can effectively locate the internal faults of the transformer through a small amount of monitoring information. The intelligent fault feature extraction process of DCNN is not affected by the extreme distribution of fault features, and there is no need to remodel the simulation when the parameters or operating conditions change slightly. Using image segmentation to extract contours can reduce the amount of data and ensure higher positioning accuracy.

BRIEF DESCRIPTION OF THE DRAWINGS

The present disclosure will be further described below with reference to the accompanying drawings and embodiments. In the drawings.

DESCRIPTION OF THE EMBODIMENTS

In order to make the purpose, technical solutions, and advantages of the present disclosure clearer, the present disclosure is further described in detail with reference to the accompanying drawings and embodiments. It should be understood that the specific embodiments described herein are only used to explain the present disclosure and are not intended to limit the present disclosure.

Figure 1:
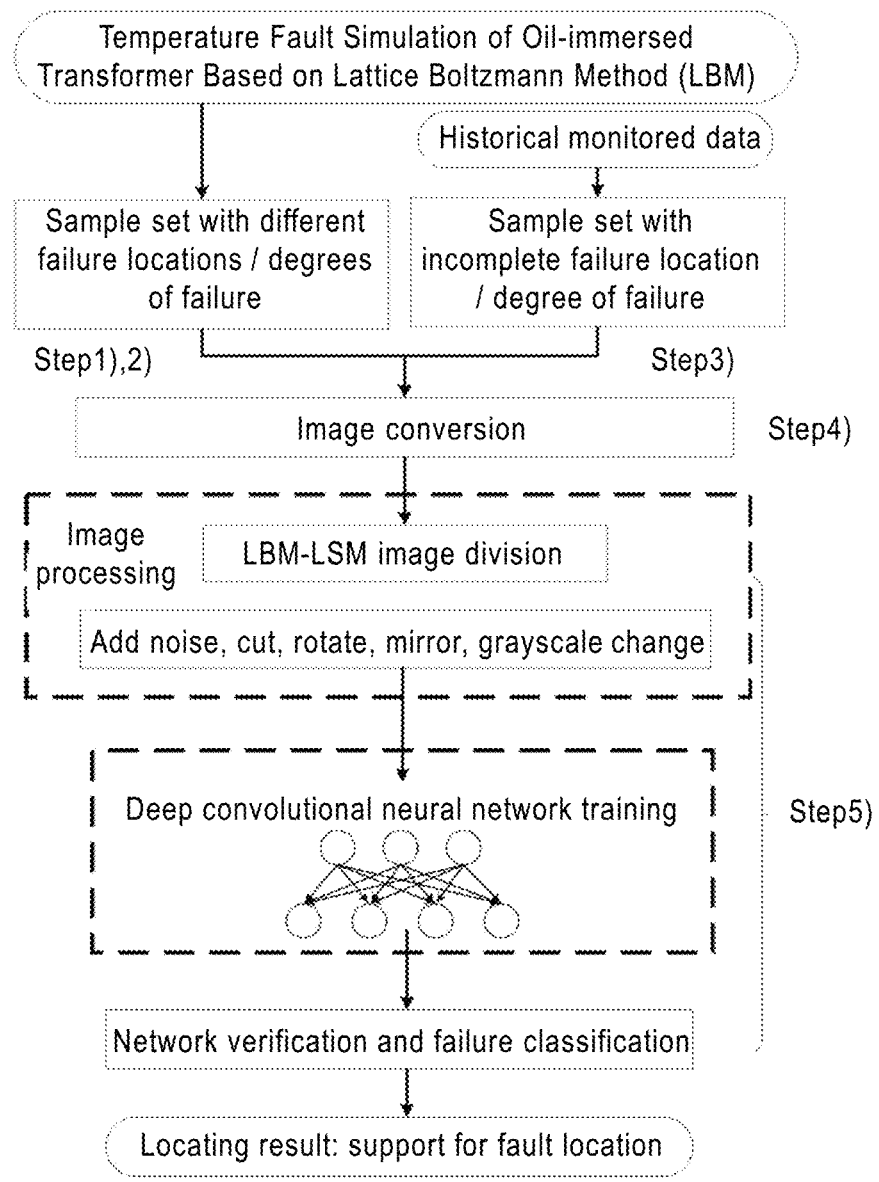
FIG. 1 is a flowchart of the present disclosure.

A method for diagnosing internal thermal faults in an oil-immersed transformer based on a deep convolutional neural network and image segmentation according to an embodiment of the disclosure, as shown in FIG. 1, includes the following steps:

1) dividing the internal area of the transformer, and using the fault area and normal status as the labels of the deep convolutional neural network (DCNN);

2) through the lattice Boltzmann simulation, randomly obtaining a large number of feature images of the internal temperature field distribution of the oil-immersed transformer under normal and various fault state modes, and the fault area is used as a label to form the underlying training sample set;

3) obtaining the historical monitoring information of the infrared camera or temperature sensor, and forming the corresponding fault diagnosis results into labels according to the division method of step 1);

4) combining all the monitoring information contained in each sample in step 3) into one image, and then extracting the same monitoring information from the samples in the underlying training sample set obtained in step 2) to form a new image;

5) segmenting the image sample obtained in step 4), and then inputting the segmented image into the deep convolutional neural network for training to generate a trained fault diagnosis network;

6) combining the monitoring information to be diagnosed into new images in the same way, and entering the new images into the trained fault diagnosis network to obtain diagnosis results.

The method for dividing and labeling the internal area of the transformer in step 1) is to divide the internal area of the transformer into several parts according to the actual monitoring requirement, and then directly assign labels according to the fault area, if there are multiple fault types, different combinations of fault types and fault areas are used as different labels.

In step 2), when conducting internal temperature field simulation of the oil-immersed transformer under various fault conditions based on the lattice Boltzmann method (LBM), the boundary condition of the fault location is modified to a bounce boundary, and the size of the fault area thereof is a random value less than 10, which is the sum of length and width. The convergence criterion is defined by calculating the temperature increment at each step until it is less than the predefined threshold ε:

$$\sum_x \frac{|T(x, t) - T(x, t-1)|}{|T(x, t)|} < \varepsilon = 10^{-7}$$

wherein T is the temperature, x is the coordinates of any point in the transformer, and t is the iteration step or simulation time. In order to improve the identification effect of DCNN, the normal state data set is subtracted from the monitoring information and combined to obtain a feature image of the temperature field distribution.

In step 3), the normal state data set is subtracted from the monitoring information and combined to obtain a feature image of the temperature field distribution. The monitoring information includes historical monitoring information of the oil-immersed transformer at any position, and the information can be collectively composed of information collected by multiple sensors, wherein each sensor is in charge of monitoring a specific area.

The method for combining the monitoring information of the infrared camera or temperature sensor into an image in step 4) is: firstly unifying all the monitoring information into a color map of a specific value range, and then combine all the information of the same sample into a picture.

The image segmentation method in step 5) uses LBM to solve the convection-diffusion equation. The specific steps are as follows. The particle density is set to φ, which is called the symbolic distance function, and represents the distance between pixels inside and outside the initial contour. Since the number of particles in each lattice cannot be negative, the number of particles is modified to φ'=φ−min(φ), the superscript "'" represents the updated value; then the contour after segmentation is a pixel that satisfies φ'=−min(φ), and the calculation steps are as follows:

① Initialize the symbol distance function φ, set φ'=φ−min(φ); the diffusion coefficient is set as γ=15, then relax time is τ=(9*γ+2)/4; $f_{out}$ represents the particle distribution of $f_{in}$ at the next moment, $f_{eq}$ is the equilibrium particle distribution, initialize $f_{out}=f_{in}=f_{eq}=0$.

② Mark the k-th type of centroid to be $v_k$, initialize $v_k$=0. Generally k=1 or 2, that is, the total number of types c=2 (including contour and non-contour areas).

(3) Assuming that the image has N pixels in total, i=1, 2, . . . , N, define the block matrix U={$u_{ki}$}, and each element $u_{ki}$ thereof represents the membership degree of the i-th pixel belonging to the k-th type. U is a function of the original image value X and the observed image value Y. It is written as a matrix form $U_k^p(x,y)$, p is the blur index generally set as the constant p=2; the contour image is marked as Y={$y_i$}, which represents the non-linear change of the distance function J of the original image after taking grayscale, then:

$$J(U, V, X) = \sum_{k=1}^{c} \sum_{i=1}^{N} u_{ki}^p \|x_i - v_k\|^2$$

$$s.t. \sum_{k=1}^{c} u_{ki} = 1, 0 \le u_{ki} \le 1, \forall k, i$$

wherein $v_k$ represents the k-th type of centroid, set the initial bias field image be B={$\beta_i$}, which is also a function of X and Y, then:

$$U_k^*(x, y) = \frac{1}{\sum_{l=1}^{c} \left(\frac{\|Y(x,y) - B(x,y) - v_k\|}{\|Y(x,y) - B(x,y) - v_l\|}\right)^{\frac{2}{(p-1)}}}$$

$$v_k^* = \frac{\int_\Omega U_k^p(x, y)(Y(x, y) - B(x, y))dxdy}{\int_\Omega U_k^p(x, y)dxdy}$$

$$B^*(x, y) = Y(x, y) - \frac{\sum_{k=1}^{c} U_k^p(x, y) v_k}{\sum_{k=1}^{c} U_k^p(x, y)}$$

wherein l is the variable used to traverse c and $\Omega$ is the solution area.

(4) Calculate the fuzzy external force F:

$$F = \lambda(U_1^p(x,y)\|Y(x,y) - B(x,y) - v_1\|^2 - U_2^p(x,y)\|Y(x,y) - B(x,y) - v_2\|^2)$$

(5) Calculate the lattice Boltzmann LBM convection collision process:

$$f_{out} = f_{in} - \frac{f_{in} - f_{eq}}{\tau} + \frac{2\tau - 1}{2\tau} F$$

wherein $f_{eq}$ is the product of the level set equation $\varphi'$ and LBM lattice constants for each iteration.

(6) Update $f_{in}' = f_{out}$, $\varphi' = \varphi' + f_{in}'$, and return to step (3) and repeat the iterations until the requirement is satisfied.

The convolutional neural network for fault diagnosis in step 5) needs to take into consideration the network depth, network size, number of network layers, and number of parameters according to the monitoring requirement, and the accuracy, simulation time, and loss function of the fault diagnosis is obtained through verification. A suitable convolutional neural network is adopted to modify the number of labels to the total number of network outputs for training verification and fault diagnosis.

The disclosure also provides an internal thermal fault diagnosis system for an oil-immersed transformer based on a deep convolutional neural network and image segmentation for realizing the above method, and specifically including:

an area division module, which is configured to divide the internal area of the transformer, and use the fault area and normal status as labels of the deep convolutional neural network;

a simulation module, which is configured to perform simulation through a lattice Boltzmann method to randomly obtain a large number of feature images of the internal temperature field distribution of the oil-immersed transformer under normal and various fault state modes, and the fault area thereof is used as a label to form an underlying training sample set;

a historical monitoring information acquisition module, which is configured to acquire historical monitoring information of the infrared camera or temperature sensor, and form the corresponding fault diagnosis results into labels according to the division method of the area division module;

an image combining module, configured to combine all the monitoring information contained in each sample in the historical monitoring information acquisition module into one image, and then extract the same monitoring information from the samples in the underlying training sample set obtained through the simulation module to form a new image;

an image segmentation module, configured to perform image segmentation on the image samples obtained through the image combining module;

a fault diagnosis network generating module, configured to input the segmented image into a deep convolutional neural network for training, and generate a trained fault diagnosis network;

a fault diagnosis module, which is used to combine the monitoring information to be diagnosed into new images in the same way, and enter the new images into the trained fault diagnosis network to obtain diagnosis results.

The present disclosure also provides a computer storage medium. The computer storage medium stores a computer program executable by a processor. The computer program executes steps of the method in the foregoing embodiment. The application example of the present disclosure is as follows.

Figure 2:
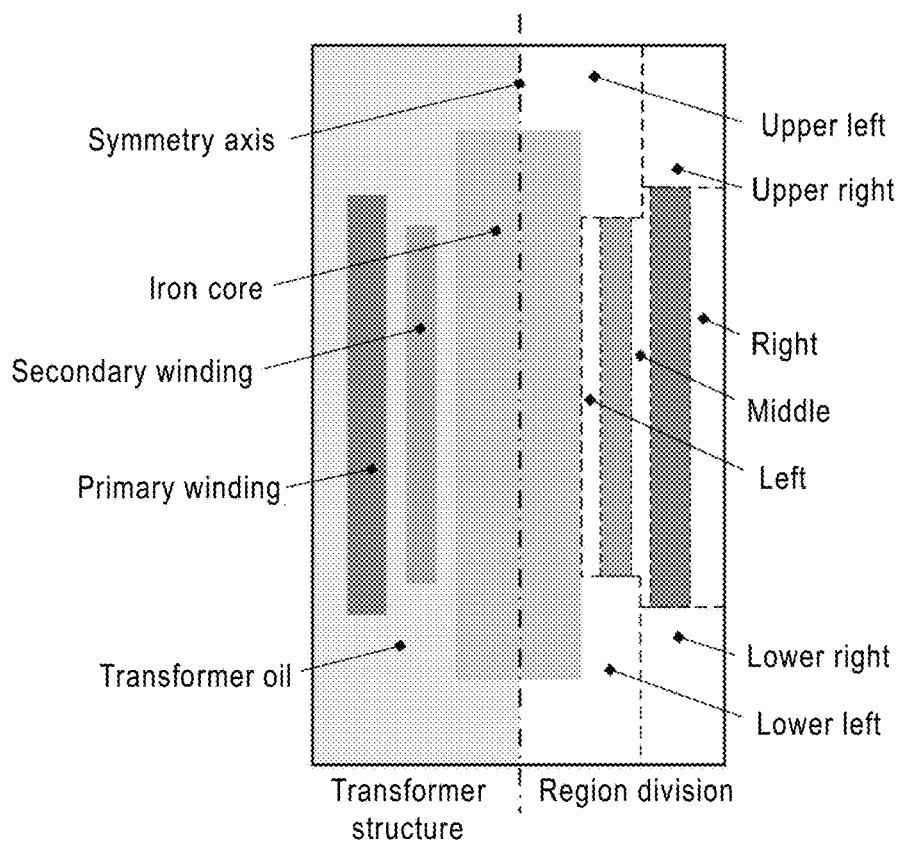
FIG. 2 is a schematic diagram of a method for dividing an internal fault area of an oil-immersed power transformer according to the present disclosure.

The internal structure of the transformer has central symmetry, and its temperature distribution only needs to take the two-dimensional distribution into consideration. First, according to step 1), the fault area division of the transformer is monitored. In this example, the internal area of the transformer is divided into 7 parts: upper left part, upper right part, left part, middle part, right part, lower left part, and lower right part, as shown in FIG. 2. The specific area division method can be adjusted according to the actual transformer structure and diagnosis and positioning needs. In this example, the upper part of the winding near the symmetry axis (iron core) and a part inside the middle surface of the primary and secondary windings are divided into a part, and which is referred to as the "upper left" area. The lower part of the winding near the symmetry axis (iron core) and the part inside the middle surface of the primary and secondary windings are also divided into a part, and which is referred to as the "lower left" area. The upper part of the winding and the part outside the middle surface of the primary and secondary windings are divided into a part, and which is referred to as the "upper right" area. The lower part of the winding and the part outside the middle surface of the primary and secondary windings are divided into a part, and which is referred to as the "lower right" area. The secondary winding to the core part is divided into the "left" area. The area between the secondary winding and the primary winding is divided into the "middle" area. The area outside the primary winding is divided into the "right" area.

There is only one type of fault in this embodiment, which is impurities in the oil, so the labels are directly assigned according to the fault location. The Lattice Boltzmann simulation method (LBM) is adopted to obtain the internal temperature field distribution image of the oil-immersed transformer. According to the method of step 2), the boundary condition of the fault location is modified to a bounce boundary, and the size of the fault area thereof is a random value less than 10, which is the sum of length and width. The convergence criterion is defined by calculating the temperature increment at each step until it is less than the predefined threshold $\varepsilon$. Then the convergence criterion is combined with the normal state data set through subtraction, thereby obtaining a feature image of the temperature field distribution. Different fault locations are set randomly to obtain a large number of fault samples, and the sample label is the corresponding fault area.

Figure 3:
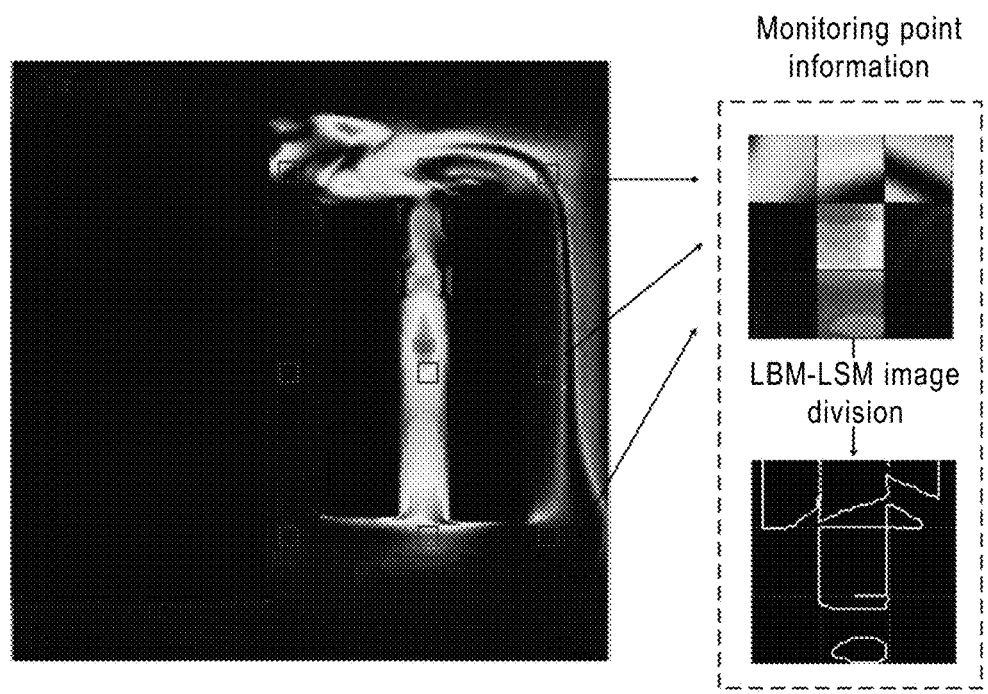
FIG. 3 is an example of a processing method for monitoring area and corresponding image of the present disclosure.

Suppose the monitoring area is near the winding as the location denoted by red box in FIG. 3. The type of the monitoring information is an infrared monitoring image. According to steps 3) and 4), the corresponding fault location is used as a label, and the temperature distribution obtained from these areas is directly stitched to form a combined monitoring point image as shown in FIG. 3. For the sample set obtained through simulation, the data at the same position as the monitoring point is extracted and combined into an image through the same method.

Figure 4:
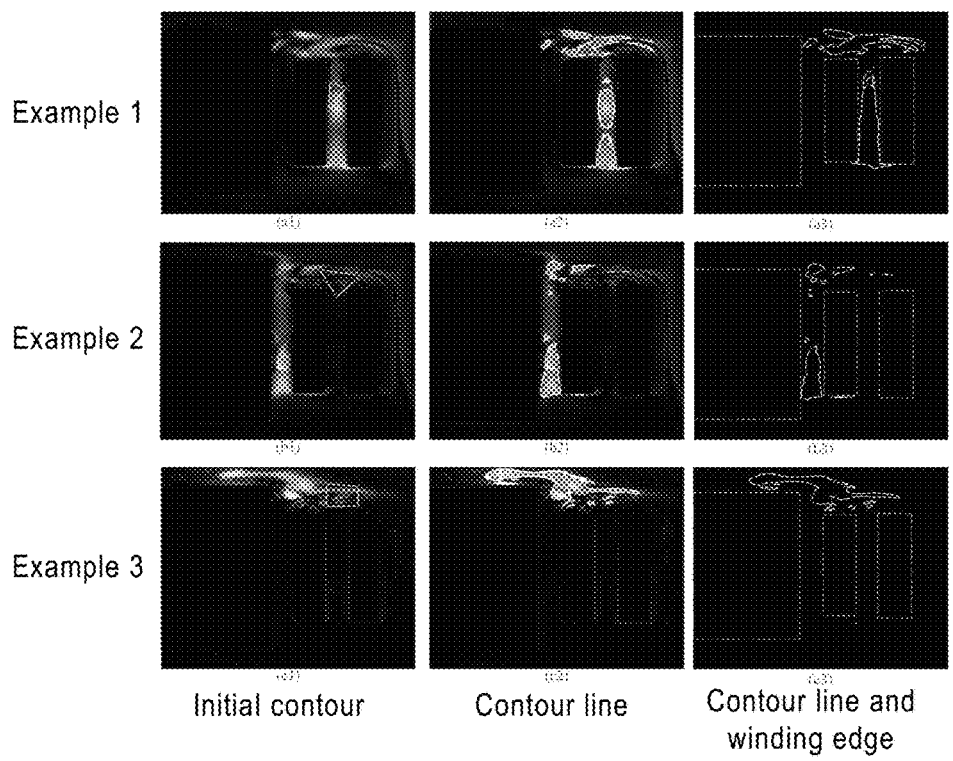
FIG. 4 is a segmentation example of a fault detection image in transformer oil of the present disclosure based on LBM-LSM.

Based on the characteristics of CNN feature extraction which focuses on edge features, the image edge information is extracted through LSM-LBM method to compress the amount of data. All the datasets are subjected to edge extraction according to the image segmentation method of step 5). The degraded area after image segmentation is set to 1 and represented by white lines, and the remaining areas are set to 0 and displayed as black. The execution effect of the image segmentation algorithm for edge extraction is shown in FIG. 4. Assume that the monitoring area includes m×n pixels, and the value of each pixel changes from 0 to 255, that is, 256=8-bit binary data. Color image consists of 3 channels of data. After edge contours is extracted through image segmentation, the value of each pixel is 0 or 1, and the dimension of the data is reduced from 3D to 2D. In addition, the contours of the abnormal areas occupy only a small part of the entire image. For example, the outline on the left in FIG. 3 contains 779 pixels, and the size of the image is 224×224. Therefore, the amount of data in the original image was reduced from m×n×3=224×224×3=150528 to 779. During data storage or transmission, each pixel of the original image requires 8-bit (1B) binary data. After the LBM-LSM image segmentation, only the data position with the value of 1 needs to be marked. According to the image size, the x-axis and y-axis need 8-bit (1B) coordinates respectively. Therefore, the total binary data required for storage or transmission is 150528×1B=147 kB and 779×2B=1.52 kB, which is only about 1% of the original data.

Randomly select 80% of the samples as the training data set and 20% of the samples as the test data set. Even for samples with the same label, due to the randomness of the location and degree of the fault, their features are not exactly the same. By randomly adding noise, cutting, rotation, mirroring, and grayscale variation in the image processing process of the sample set, it is possible to effectively prevent overfitting. The training sample set is shown in Table 1.

TABLE 1

| | | | | Training Data Set | | | | | |
|---|---|---|---|---|---|---|---|---|---|
| Fault area | Number of original images | Grayscale image | Rotation | Mirroring | Cutting | Adding noise | Total image | Training data (80%) | Verification data (20%) |
| Right | 25 | 25 | 100 | 25 | 75 | 25 | 275 | 220 | 55 |
| Left | 25 | 25 | 100 | 25 | 75 | 25 | 275 | 220 | 55 |
| Middle | 25 | 25 | 100 | 25 | 75 | 25 | 275 | 220 | 55 |
| Upper left | 15 | 15 | 60 | 15 | 45 | 15 | 165 | 132 | 33 |
| Upper right | 15 | 15 | 60 | 15 | 45 | 15 | 165 | 132 | 33 |
| Lower left | 15 | 15 | 60 | 15 | 45 | 15 | 165 | 132 | 33 |
| Lower right | 15 | 15 | 60 | 15 | 45 | 15 | 165 | 132 | 33 |
| Normal state | 50 | 50 | 200 | 50 | 150 | 50 | 550 | 440 | 88 |
| Total | 185 | 185 | 740 | 185 | 555 | 185 | 2035 | 1628 | 407 |

Figure 5:
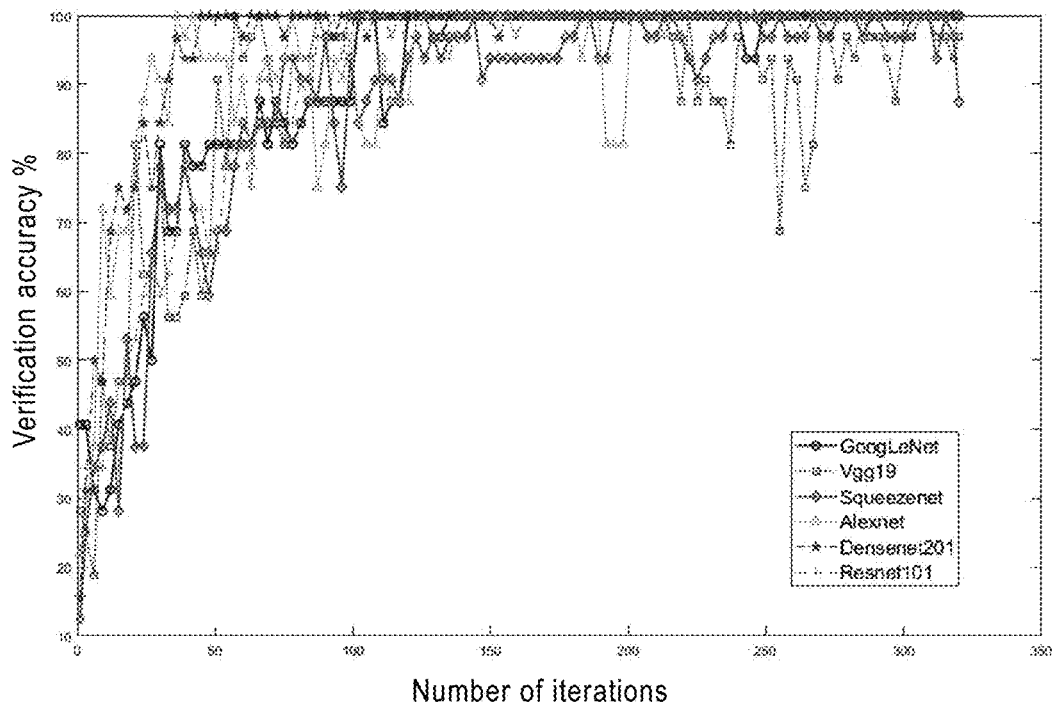
FIG. 5 is a verification accuracy rate of fault positioning for different convolutional neural networks according to the present disclosure.

In this embodiment, GoogLeNet, Vgg16, Vgg19, Squeezenet, Alexnet, Densenet201, Resnet18, Resnet50 and Resnet101 are used for training verification. In order to facilitate observation, only the fault diagnosis training process of GoogLeNet, Vgg19, Squeezenet, Alexnet, Densenet201, and Resnet101 is shown in the figure, as shown in FIG. 5. The complete verification results are shown in Table 2.

TABLE 2

| | Verification Results Based On Each Deep Convolutional Neural Network | | | | | | |
|---|---|---|---|---|---|---|---|
| Network name | Accuracy (%) | Loss | Times of iterations | Iteration time (s) | Depth | Size (MB) | Parameter (million) |
| GoogLeNet | 100 | 0.00702 | 320 | 912 | 22 | 27 | 7.0 |
| Vgg16 | 96.875 | 0.161201 | 320 | 4894 | 16 | 515 | 138 |
| Vgg19 | 96.875 | 0.09310135 | 320 | 6085 | 19 | 535 | 144 |

TABLE 2-continued

Verification Results Based On Each Deep Convolutional Neural Network

| Network name | Accuracy (%) | Loss | Times of iterations | Iteration time (s) | Depth | Size (MB) | Parameter (million) |
|---|---|---|---|---|---|---|---|
| Squeezenet | 87.5 | 0.280391 | 320 | 418 | 18 | 4.6 | 1.24 |
| Alexnet | 100 | 0.000838 | 320 | 412 | 8 | 227 | 61.0 |
| Densenet201 | 100 | 0.0131 | 320 | 4713 | 201 | 77 | 20.0 |
| Resnet18 | 100 | 0.042995 | 320 | 862 | 18 | 44 | 11.7 |
| Resnet50 | 100 | 0.009133 | 320 | 2551 | 50 | 96 | 25.6 |
| Resnet101 | 100 | 0.016325 | 320 | 4101 | 101 | 167 | 44.6 |

With reference to the data in FIG. 5 an Table 2, it can be seen that, in this embodiment, GoogLeNet can quickly obtain a fault positioning result with higher accuracy rate and has high stability, while the network size and number of parameters are better, and can be adopted as the ultimate training network in the example.

Finally, the monitoring information to be diagnosed is preprocessed in the same way and input to the trained fault diagnosis network to obtain the diagnosis results. The diagnosis result herein is actually a support vector, which gives the probability that the test sample belongs to different fault areas or normal status. In general, as in the above network training verification process, the most likely fault area is taken as the final diagnosis result.

In summary, the disclosure can realize the detection and positioning of internal thermal faults in oil-immersed transformers; image segmentation can compress the data size and highlight useful information. Through image transformation and Convolutional Neural Network (CNN), it is possible to realize integration of unstructured monitoring information and self-adaptive feature extraction, thereby achieving fault positioning diagnosis.

It should be understood that for persons of ordinary skill in the art, improvements or changes can be made according to the above description, and all these improvements and changes should fall within the protection scope of the appended claims of the present disclosure.

What is claimed is:

1. An internal thermal fault diagnosis method of an oil-immersed transformer based on deep convolutional neural network and image segmentation, comprising the following steps:
    1) dividing an internal area of a transformer, and using a fault area and a normal status as a labels of a deep convolutional neural network;
    2) through lattice Boltzmann simulation, randomly obtaining a plurality of feature images of an internal temperature field distribution of the oil-immersed transformer under normal and various fault state modes, and the fault area is used as the label to form an underlying training sample set;
    3) obtaining historical monitoring information of an infrared camera or a temperature sensor as samples, and forming its corresponding fault diagnosis results into the labels of the deep convolutional neural network according to the division method of step 1);
    4) combining all the monitoring information contained in each of the samples in step 3) into one image as an image sample, and then extracting the same monitoring information from the samples in the underlying training sample set obtained in step 2) to form a new image;
    5) segmenting the image sample obtained in step 4), and then inputting the segmented image into the deep convolutional neural network for training to generate a trained fault diagnosis network;
    6) combining a monitoring information to be diagnosed into new images to be diagnosed according to the same way of step 4), and entering the new images to be diagnosed into the trained fault diagnosis network to obtain a diagnosis result.

2. The internal thermal fault diagnosis method according to claim 1, wherein the method for dividing and labeling the internal area of the transformer in step 1) is: dividing the internal area of the transformer into several parts according to actual monitoring requirement, and then directly assigning labels according to the fault area, if there are multiple fault types, different combinations of fault types and fault areas are used as different labels.

3. The internal thermal fault diagnosis method according to claim 1, wherein in step 2), when conducting internal temperature field simulation of the oil-immersed transformer under various fault conditions based on the lattice Boltzmann method, a boundary condition of a fault location is modified to a bounce boundary, and the size of the fault area thereof is a random value less than 10, which is the sum of length and width; a convergence criterion is defined by calculating temperature increment at each step until it is less than a predefined threshold ε:

$$\sum_x \frac{|T(x, t) - T(x, t-1)|}{|T(x, t)|} < \varepsilon$$

wherein T is temperature, x is coordinates of any point in the transformer, and t is iteration step or simulation time.

4. The internal theimal fault diagnosis method according to claim 1, wherein in step 3), a normal state data set is subtracted from the monitoring information and combined to obtain a feature image of the temperature field distribution.

5. The internal thermal fault diagnosis method according to claim 1, wherein the method for combining the monitoring information of the infrared camera or the temperature sensor into the image in step 4) is: firstly unifying all the monitoring information into a color map of a specific value range, and then combining all the infoi illation of the same sample into a picture.

6. The internal thermal fault diagnosis method according to claim 1, wherein the image segmentation method in step 5) uses LBM to solve a convection-diffusion equation, a particle density is set to φ, which is called a symbolic distance function, and represents a distance between pixels inside and outside an initial contour; since the number of particles in each lattice cannot be negative, the number of particles is modified to φ'=φ−min (φ), the superscript "'"

represents an updated value; then a contour after segmentation is a pixel that satisfies φ'=−min (φ), and the calculation steps are as follows:
① initialize the symbol distance function φ, set φ'=φ−min (φ); the diffusion coefficient is set as γ=15, then relax time is τ=(9*γ+2)/4; $f_{out}$ represents the particle distribution of $f_{in}$ at the next moment, $f_{eq}$ is the equilibrium particle distribution, initialize $f_{out}=f_{in}=f_{eq}=0$;
② mark the k-th type of centroid to be $v_k$, initialize $v_k=0$; generally k=1 or 2, that is, the total number of types c=2 (including contour and non-contour areas);
③ assuming that the image has N pixels in total, i=1, 2, . . . , N, define the block matrix U={$u_{ki}$}, and each element $u_{ki}$ thereof represents the membership degree of the i-th pixel belonging to the k-th type. U is a function of the original image value X and the observed image value Y. It is written as a matrix form $U_k^p(x,y)$, p is the blur index generally set as the constant p=2; the contour image is marked as Y={$y_i$}, which represents the non-linear change of the distance function J of the original image after taking grayscale, then:

$$J(U, V, X) = \sum_{k=1}^{c} \sum_{i=1}^{N} u_{ki}^p \|x_i - v_k\|^2$$

$$\text{s.t.} \sum_{k=1}^{c} u_{ki} = 1, 0 \leq u_{ki} \leq 1, \forall k, i$$

wherein $v_k$ represents the k-th type of centroid, set the initial bias field image be B={$β_i$}, which is also a function of X and Y, then:

$$U_k^*(x, y) = \frac{1}{\sum_{l=1}^{c} \left(\frac{\|Y(x, y) - B(x, y) - v_k\|}{\|Y(x, y) - B(x, y) - v_l\|}\right)^{\frac{2}{(p-1)}}}$$

$$v_k^* = \frac{\int_{\Omega} U_k^p(x, y)(Y(x, y) - B(x, y))dxdy}{\int_{\Omega} U_k^p(x, y)dxdy}$$

$$B^*(x, y) = Y(x, y) - \frac{\sum_{k=1}^{c} U_k^p(x, y)v_k}{\sum_{k=1}^{c} U_k^p(x, y)}$$

wherein l is the variable used to traverse c and Ω is the solution area;
④ calculate the fuzzy external force F:

$$F=\lambda(U_1^p(x,y)\|Y(x,y)-B(x,y)-v_1\|^2-U_2^p(x,y)\|Y(x,y)-B(x,y)-v_2\|^2)$$

⑤ calculate the lattice Boltzmann LBM convection collision process:

$$f_{out} = f_{in} - \frac{f_{in} - f_{eq}}{\tau} + \frac{2\tau - 1}{2\tau}F$$

wherein $f_{eq}$ is the product of the level set equation φ' and LBM lattice constants for each iteration;

⑥ update $f_{in}'=f_{out}$, φ'=φ'+$f_{in}'$, and return to step ③ and repeat the iterations until the requirement is satisfied.

7. The internal thermal fault diagnosis method according to claim 1, wherein the convolutional neural network for fault diagnosis in step 5) needs to take into consideration the network depth, network size, number of network layers, and number of parameters according to the monitoring requirement, and the accuracy, simulation time, and loss function of the fault diagnosis is obtained through verification; a suitable convolutional neural network is adopted to modify the number of labels to the total number of network outputs for training verification and fault diagnosis.

8. An internal thermal fault diagnosis system for an oil-immersed transformer based on deep convolutional neural network and image segmentation, comprising:
a processor, configured to:
1) divide an internal area of a transformer, and use a fault area and a normal status as labels of the deep convolutional neural network;
2) perform simulation through a lattice Boltzmann method to randomly obtain a plurality of feature images of an internal temperature field distribution of the oil-immersed transformer under normal and various fault state modes, and the fault area thereof is used as a label to form an underlying training sample set;
3) acquire historical monitoring information of an infrared camera or a temperature sensor as samples, and form its corresponding fault diagnosis results into the labels of the deep convolutional neural network according to the division method of step 1);
4) combine all monitoring information contained in each of the samples into one image as an image sample, and then extract the same monitoring information from the samples in the underlying training sample set obtained in step 2);
5) perform image segmentation on the image sample obtained in step 4);
6) input the segmented image into the deep convolutional neural network for training, and generate a trained fault diagnosis network;
7) combine a monitoring information to be diagnosed into new images to be diagnosed according to the same way of step 4), and input the new images to be diagnosed into the trained fault diagnosis network to obtain a diagnosis result.

9. A non-transitory computer storage medium, wherein the computer storage medium stores a computer program executable by a processor, and the computer program executes steps of the internal thermal fault diagnosis method according to claim 1.

10. A non-transitory computer storage medium, wherein the computer storage medium stores a computer program executable by a processor, and the computer program executes steps of the internal thermal fault diagnosis method according to claim 2.

11. A non-transitory computer storage medium, wherein the computer storage medium stores a computer program executable by a processor, and the computer program executes steps of the internal thermal fault diagnosis method according to claim 3.

12. A non-transitory computer storage medium, wherein the computer storage medium stores a computer program executable by a processor, and the computer program executes steps of the internal thermal fault diagnosis method according to claim 4.

13. A non-transitory computer storage medium, wherein the computer storage medium stores a computer program executable by a processor, and the computer program executes steps of the internal thermal fault diagnosis method according to claim 5.

14. A non-transitory computer storage medium, wherein the computer storage medium stores a computer program executable by a processor, and the computer program executes steps of the internal thermal fault diagnosis method according to claim 6.

15. A non-transitory computer storage medium, wherein the computer storage medium stores a computer program executable by a processor, and the computer program executes steps of the internal thermal fault diagnosis method according to claim 7.

\* \* \* \* \*